United States Patent Office 2,700,030
Patented Jan. 18, 1955

2,700,030

MANUFACTURE OF AN ETHERIFICATION PRODUCT OF A POLY-GLYCIDYL ETHER OF A POLY-OXY COMPOUND WITH A HIGHER MONOHYDRIC ALCOHOL

Gustav Widmer, Basel, and Paul Zuppinger, Binningen, Switzerland, assignors to Ciba Limited, Basel, Switzerland, a Swiss firm No Drawing. Application December 15, 1952, Serial No. 326,151

Claims priority, application Switzerland December 21, 1951

15 Claims. (Cl. 260—47)

The present invention provides an etherification product of a poly-glycidyl ether of a poly-hydroxy-compound, which contains at least two hydroxyl groups and is otherwise free from substituents capable of reacting with epoxide groups, with a higher monohydric alcohol containing a carbon chain of more than 10 carbon atoms.

The invention also includes a process for the manufacture of the aforesaid products, wherein the higher alcohol is reacted with the poly-glycidyl-ether, and advantageously there is used for at least one mol of the higher alcohol a quantity of the polyglycidyl ether corresponding to one epoxide gram equivalent.

As polyhydroxy compounds, which contain at least two hydroxyl groups and are free from substituents capable of reacting with epoxide groups, there come into consideration polyhydric aliphatic alcohols such as glycol or glycerine, or polyhydric, more especially dihydric, phenols such as resorcinol and the like. Especially interesting, however, are polyhydric polynuclear phenols, such as 4:4'-dihydroxydiphenyl-dimethyl methane.

As polyhydroxyglycidyl ethers of polyhydroxy compounds there are suitable products such as are obtainable in known manner, for example, by the reaction of aliphatic polyhydroxy compounds with epichlorhydrin in the presence, for example, of sulfuric acid, followed by treatment of the resulting polychlorhydrin ethers with alkalis. There may also be used products obtained by reacting aromatic polyhydroxy compounds with epichlorhydrin or dichlorhydrin in the presence of an aqueous alkali by a method in itself known. The reaction products obtained by this process are in very few cases unitary compounds, but are almost always mixtures which consist predominantly of polyglycidyl ethers having chains of different lengths carrying terminal epoxide groups, and, if desired, intermediate hydroxyl groups.

As monohydric alcohols containing a carbon chain of more than 10 carbon atoms, which are reacted with the polyglycidyl ethers in accordance with the invention, there come into consideration saturated or unsaturated, aliphatic or cyclic alcohols or mixtures of such alcohols. There may be mentioned for example: Undecyl alcohol, dodecyl alcohol, cetyl alcohol, octadecyl alcohol, myricyl alcohol, oleyl alcohol, linolenyl alcohol, linoleyl alcohol and abietinol, and also the glycol monoethers or glycerine diethers of such alcohols. Very suitable also are alcohols or mixtures thereof, which are obtainable by the reduction of higher fatty acids obtained, for example, by the oxidation of paraffin wax, and also higher alcohols obtainable by total synthesis from carbon monoxide and hydrogen, or mixtures of such alcohols, and furthermore commercial mixtures of alcohols such as are obtainable, for example, by reduction with sodium and alcohol or by other methods from drying, semi-drying, oven-drying or non-drying triglyceride oils, for example, linseed oil, soya bean oil, dehydrated castor oil, poppy seed oil, hemp seed oil, cotton seed oil, coconut oil, cod liver oil, whale oil, menhaden oil, sperm oil, tall oil or tall oil esters, and the like.

The polyglycidyl ethers used as starting materials and the etherification products obtainable therefrom in accordance with the invention are characterized by determining their content of epoxide groups and groups capable of esterification, and from these values their content of hydroxyl groups is calculated in the manner described below. The values so obtained are expressed as the number of gram equivalents per kilogram of the product to be characterized, and are hereinafter referred to as "Ep-Equ/kg," "V-Equ/kg" and "OH-Equ/kg," respectively. As one Ep-Equ corresponds to two V-Equ the number of OH-Equ/kg can be calculated in a simple manner from the number of V-Equ/kg by subtracting the number of Ep-Equ/kg multiplied by 2. In order to determine the two last mentioned values there is used the method described in "Bulletin der Schweizerischen Vereinigung der Lack- und Farbenchemiker und Techniker," International Session, Basel, 11th-12th May 1949, 3rd Special number, page 56. In the absence of epoxide groups the V-Equ is identical with the OH-Equ.

From the foregoing it will be understood that one epoxide-gram equivalent ("Ep-Equ") of a polyglycidyl ether having $x$ Ep-Equ/kg corresponds to a quantity of $$\frac{1000}{x}$$

grams of the polyglycidyl ether.

The reaction between the polyglycidyl ether and the higher alcohol can be carried out even at a low temperature, for example, at room temperature, in which case the use of a very active catalyst, such as boron trifluoride is indispensible. As a rule, however, the reaction is carried out at a higher temperature, in which case the use of a catalyst is of advantage although not always essential.

The reaction of the polyglycidyl ether with the higher alcohol may be carried out in the presence of a suitable solvent for example, dioxane, which is especially advantageous or may even be indispensable, when the reaction components are only sparingly or not at all miscible with one another to produce a homogeneous mixture.

The reaction components, including a solvent or a catalyst, may be mixed together in any desired sequence. However, it is advantageous to add the dissolved polyglycidyl ether in portions or continuously to the heated higher alcohol admixed with the catalyst. Alternatively, the polyglycidyl ether may be mixed with the higher alcohol, and the mixture heated, if desired, with the addition of a catalyst, such as boron trifluoride, sodium hydroxide or sulfuric acid.

It will be understood that the temperature at which the reaction mixture must be maintained depends on the nature of the starting materials used and on whether a catalyst and/or a solvent is used. In general the temperature is in the vicinity of the boiling point of the solvent if a solvent is used, and when working without a solvent the temperature should be at least high enough to enable a homogeneous mixture to be obtained, for example, by stirring. When decomposition phenomena are likely to occur during the reaction, it may also be carried out in the presence of an inert gas, such as nitrogen.

In general the reaction is continued until epoxide groups are no longer detected in the reaction mass.

After the reaction any catalyst or solvent may be eliminated, if its presence is undesired in the further use of the etherification product. Thus, the catalyst may be eliminated, for example, by neutralization and separation of the resulting salt by filtration, and the solvent may be removed by distillation, advantageously under reduced pressure.

The products so obtained are almost always mixtures of etherification products with unreacted higher alcohol, which products can be used for a wide variety of purposes directly or after distilling off the unchanged higher alcohol, advantageously under reduced pressure.

The expression "etherification products of polyglycidyl ethers" is used herein to denote the mixtures still containing unreacted higher alcohol and also the products freed from such alcohol.

Owing to their stability to the action of alkalis the etherification products still containing the unchanged higher alcohols or freed therefrom are valuable substances, which are liquid, oily to salve-like or solid depending on the nature of the starting materials used, and which owing to the presence of HO-groups and, if desired, unsaturated bonds are capable of undergoing further reaction. As substances capable of reacting with HO-groups, which may be used for after-treating the products, there may be mentioned, for example, acid anhydrides, such as phthalic anhydride or maleic anhydride, or organic, if desired, unsaturated acids such as abietic acid or linseed oil fatty acid; or mono- or poly-isocyanates, for example, aromatic isocyanates, such as phenyl isocyanate; or condensation products containing methylol groups and obtained from formaldehyde and a compound yielding hardenable products with the latter, such as phenol, urea or an aminotriazine containing at least two $NH_2$ groups, for example, melamine, benzoguanamine, acetoguanamine or formoguanamine, the methylol groups of the condensation product being at least partially etherified with a lower alcohol containing 1 to 4 carbon atoms. When the polyglycidyl ethers are reacted with unsaturated higher alcohols the resulting products may be polymerized in the usual manner before or after the subsequent treatments described above. By these after-treatments the resulting etherification products can be further modified to suit the purpose for which they are to be used.

The invention also includes the aforesaid after-treatments and the resulting modified and, if desired polymerized etherification products.

The etherification products of polyglycidyl ethers and especially the modified products obtainable by the aforesaid after-treatments, are suitable for a very wide variety of purposes, especially for the production of lacquers, if desired, in admixture with other lacquer-forming substances which are compatible with the etherification products, for example, alkyd resins, epoxide resins, styrenized oils or other oil-containing binding agents and the like, and also formaldehyde condensation products of phenol, urea or aminotriazines such as melamine. Etherification products of such unsaturated alcohols as are obtainable for example, from semi-drying oils by reduction, generally yield after the addition of one of the usual driers, such as a manganese, lead or cobalt drier, very good oven-drying lacquers. Etherification products derived from highly unsaturated alcohols, for example, from linseed oil fatty alcohol, have good oven-drying properties, and after the addition of the drier good air-drying properties.

The following examples illustrate the invention the parts and percentages being by weight, and the pressures being given in millimetres of mercury (mm. Hg).

*Example 1*

554 parts of linseed oil fatty alcohol (2 mols) having an iodine number (JZ) of about 166 (methods described by Turpenen in the Journal of the American Chemical Society, volume 60, pages 56–7, [1938]) were mixed with 0.424 part of boron trifluoride dissolved in anisole, and the mixture was heated in a flask fitted with stirring means to about 70° C. 424 parts (2 Ep-Equ) of the polyglycidyl ether described below, dissolved in 420 parts of dioxane, were introduced dropwise in the course of about 1½–2 hours, while stirring. The dioxane was then distilled off under reduced pressure. There was obtained an approximately colorless product of medium viscosity, which no longer contains epoxide groups, and had an iodine number of about 100 and contained about 2.7 OH-Equ/kg. This product may be subjected to further reactions, for example, as described in the succeeding Examples 7, 9 and 10.

The polyglycidyl ether used in this example was prepared as follows:

228 parts of dihydroxydiphenyl-dimethyl methane (1 mol) were reacted with 555 parts of epichlorhydrin (6 mols) in the presence of an aqueous solution containing 2 mols of caustic soda, and the product was washed and dried. The resulting product of medium viscosity contained about 4.7 Ep-Equ/kg, about 10.7 V-Equ/kg and about 1.3 OH-Equ/kg.

*Example 2*

The procedure was the same as that described in Example 1, except that after the distillation of the dioxane 140 parts of the unreacted linseed oil fatty alcohol were removed by distillation under a pressure of about 3 mm. Hg and at an external temperature of 240 to 285° C. (oil bath). There were obtained 880 parts of an approximately colorless reaction product of medium viscosity at about 20° C. and containing 2.34 OH-Equ/kg.

*Example 3*

A mixture of 540 parts of octadecyl alcohol (2 mols) and about 0.21 part of boron trifluoride dissolved in anisole was heated to about 70° C. A mixture of 416 parts (1.95 Ep-Equ) of the polyglycidyl ether described in the second paragraph of Example 1 and 416 parts of dioxane was added dropwise to the octadecyl alcohol in the course of about 2 hours while stirring. The dioxane was then distilled off under reduced pressure on a water bath. No epoxide groups could be detected in the resulting product. 184 parts of the unreacted octadecyl alcohol were distilled off under reduced pressure at an oil bath temperature of at most 270° C. There were obtained 772 parts of the wax-like, solid and pale brown product freed from excess of octadecyl alcohol and containing 2.4 OH-Equ/kg, and a softening point of 43° C. determined by the method of Krämer-Sarnow.

*Example 4*

The procedure was the same as that described in Example 3, except that, instead of 540 parts of octadecyl alcohol, there were used 540 parts of soya bean fatty alcohol, and instead of 0.21 part of boron trifluoride 0.325 part of boron trifluoride, and that the removal of the unreacted alcohol was dispensed with. The product free from epoxide groups contained 2.9 OH-Equ/kg and had a good compatibility with white spirit.

In admixture with, advantageously etherified, formaldehyde condensation products of urea, aminotriazines or phenols, the above product is suitable for producing lacquers baking at a temperature of 180–220° C. Depending on the quantity and nature of the components used and on the baking time and temperature, there are obtained slightly pale yellow to gold-yellow coatings of good elasticity and surface hardness, and also gloss and resistance to chemicals and water.

*Example 5*

A mixture of 576 parts (2 mols) of abietin alcohol and about 0.82 part of boron trifluoride dissolved in anisole was heated on the water bath at 97° C. A solution of 820 parts (2 Ep-Equ.) of the polyglycidyl ether described below in 820 parts of dioxane was added dropwise to the abietin alcohol in the course of about 2 hours while stirring well.

The dioxane was then distilled off under reduced pressure, and the unreacted 216 parts of abietin alcohol were removed from the reaction mixture under a pressure of about 2 mm. Hg and at an oil bath temperature of about 300° C. There were obtained 1120 parts of a product resembling colophony free from epoxide groups and insoluble in white spirit which had a softening point of 80–81° C. according to Krämer-Sarnow and containing 2.75 OH-Equ./kg. By boiling the resulting resin with a mixture of linseed oil, wood oil and stand oil there can be obtained a lacquer base soluble in white spirit, which dries well after the addition of a drier and has good film-forming properties.

The polyglycidyl ether used in this example was prepared as follows:

228 parts of dihydroxydiphenyl-dimethyl methane (1 mol) were reacted with 148 parts of epichlorhydrin (1.6 mol) in the presence of an aqueous solution of caustic soda, and the product was washed and dried. The resulting brittle resin contained about 2.4 Ep-Equ/kg.

*Example 6*

A mixture of 100 parts (0.635 Ep-Equ) of a polyglycidyl ether of glycol, prepared as described below, and 632 parts (2.3 mols) of linseed oil fatty alcohol was heated in an atmosphere of nitrogen for about 5 hours on an oil bath having a temperature of about 280–300° C. While still warm the reaction product was filtered through a layer of filtration earth, and then the unreacted linseed oil fatty alcohol was distilled from the filtrate under a pressure of about 5 mm. Hg at an oil bath temperature of about 280° C. There were obtained about 300 parts of a brown, epoxide-free etherification product of medium viscosity containing 2.9 OH-Equ./kg. The product is soluble in white spirit and has good oven-drying properties after the addition of a drier.

The above etherification reaction can also be carried out by continually controlling the decrease in the content of epoxide groups and interrupting the etherification by cooling at the instant at which the product has the desired content of epoxide groups. Thus, for example, by interrupting the reaction after heating for 1½ hours a product is obtained which contains 0.1 Ep-Equ/kg.

The polyglycidyl ether of glycol containing 6.35 Ep-Equ./kg used in this example was prepared from glycol and epichlorohydrin as described on page 5 of British specification No. 518,057. In this manner there was obtained, not as might be supposed from the aforesaid specification the unitary diglycidyl ether of glycol, but a mixture of high molecular polyglycidyl ethers of glycol.

Example 7

720 parts of the etherification product obtained as described in Example 1, after the addition of 3 parts of aqueous hypophosphorous acid of about 60 per cent. strength, were heated in an atmosphere of carbon dioxide or nitrogen at an oil bath temperature of about 310° C. for about 5½ hours under a pressure of 170–250 mm. Hg, while stirring. The viscosity increased due to the polymerization, so that a highly viscous and pale brown product was obtained which is suitable, for example, as a lacquer base. It contained about 2.7 OH-Equ/kg. A solution of this product of about 40 per cent. strength in a mixture of 15 parts of white spirit and 1 part of toluene mixed with a suitable drier, after being poured on to a glass plate, left a lacquer film which dried at room temperature in about 3½ to 4 hours, which film was distinguished by its good resistance to alkali.

Example 8

In a manner similar to that described in Example 7, the etherification product obtained as described in Example 2 was polymerized with the application of heat. The polymerization product so obtained had practically the same properties as the product of Example 7.

Example 9

In order to esterify the hydroxyl groups 360 parts of the etherification product obtained as described in Example 1 were heated with 66.6 parts of phthalic anhydride in the presence of 2.26 parts of aqueous hypophosphorous acid of about 60 per cent. strength in an atmosphere of carbon dioxide at an oil bath temperature of 220–230° C. for 8–9 hours under a pressure of 240–260 mm. Hg, while stirring. The pale yellow reaction product resembling an alkyd resin, had an acid number of 3.3, was compatible with white spirit, dried very well, and had good film-forming properties.

Instead of the 66.6 parts of phthalic anhydride used in the preceding paragraph there may be used, for example, 24.5 parts of maleic anhydride, 151 parts of colophony or 195 parts of linseed oil fatty acid, valuable lacquer bases being likewise obtained.

Example 10

In order to cause the hydroxyl groups present to enter into reaction 370 parts of the product obtained as described in Example 1 were heated with 119 parts of phenyl isocyanate under reflux on a boiling water bath for about 2 hours, while stirring well. The unreacted phenyl isocyanate was then removed from the reaction mixture under reduced pressure at an oil bath temperature of at most 200° C. There were obtained 465 parts of a product of medium to high viscosity containing 0.48 OH-Equ/kg. The compatibility of the product with white spirit was good.

Example 11

104 parts of linseed oil fatty alcohol, which had an iodine number of about 165, were mixed with 0.885 part of a solution of 12 per cent. strength of boron trifluoride in anisole. Into this mixture there was slowly introduced dropwise, while stirring well, in the course of about 1 hour a solution of 106 parts of the polyglycidyl ether described in the second paragraph of Example 1 in 106 parts of dioxane. The mixture, which initially had a temperature of about 20° C., was then stirred for a further 3 hours during which it heated up to about 40° C. From the epoxide-free solution the dioxane was then distilled off on a water bath under reduced pressure in the course of about 2 hours. There were obtained about 216 parts of a pale yellow viscous etherification product having an iodine number of about 95 and containing about 2.5 HO-Equ/kg.

A solution of about 50 per cent. strength of the resulting product in white spirit containing a suitable drier, when poured on to a glass plate, left a dust-dry coating after standing at room temperature for 3½ hours.

Example 12

75 parts of the etherification product obtained as described in the first paragraph of Example 4 were heated, in order to react the hydroxyl groups present, with 25 parts of a melamine-formaldehyde condensation product containing about 5 methoxymethyl groups for about 5½ hours with the introduction of carbon dioxide and at about 120–150° C. (internal temperature) under a pressure of about 700 mm. Hg. The resulting highly viscous product contained about 1.2 HO-Equ/kg.

The above product was dissolved in its own weight of white spirit, mixed with 0.5 per cent. of lead and 0.1 per cent. of cobalt in the form of their naphthenates as driers, and then poured for example on to glass and after being maintained for about 1½ hours at 22° C. a dust-dry coating having good lacquer properties was obtained.

Example 13

41.8 parts of commercial linseed oil fatty alcohol glycerine diether, prepared in the manner described below, were heated with 1.35 parts of a solution of 5.2 per cent. strength of boron trifluoride in anisole at about 70° C., while stirring. To the solution there were added dropwise in the course of 25 minutes at a temperature of about 70–75° C., while stirring, a solution of 21.5 parts of the polyglycidyl ether mentioned in the second paragraph of Example 1 in 64.5 parts of dioxane. The temperature was maintained for a further 55 minutes at about 70–75° C., whereupon epoxide groups could no longer be detected in the reaction product. By the addition of a 1 N-alcoholic solution of caustic soda (about 4 parts by volume), the boron trifluoride was decomposed, and then the dioxane was distilled off on the water bath under reduced pressure. The resulting etherification product was a yellowish highly viscous mass soluble, for example, in toluene.

The commercial linseed oil fatty alcohol glycerine diether used in this example was prepared as follows:

35.2 parts (0.88 mol) of sodium hydroxide was dissolved while stirring at about 100–110° C. in 432 parts (1.63 mols) of a mixture of linseed oil fatty alcohols prepared from linseed oil by reduction with sodium in the presence of butyl alcohol. 37 parts (0.4 mol) of epichlorhydrin were added dropwise in the course of about one hour to the resulting solution at a temperature of about 100–105° C., while stirring. The temperature of the reaction mass was maintained at about 150° C. for a further 3 hours, then the caustic soda solution was neutralised with aqueous concentrated hydrochloric acid, and the precipitated sodium chloride was filtered off. The residue on the filter was washed with petroleum ether, and the solvent and unreacted linseed oil fatty alcohol were distilled from the combined filtrates under reduced pressure. After washing the resulting product with methanol and distilling off the latter, 175 parts of commercial linseed oil fatty alcohol glycerine diether having an OH-Equ/kg. of about 2.3 were obtained.

What is claimed is:

1. An etherification product of (a) a polyglycidyl ether with (b) a higher monohydric alcohol containing a carbon chain of more than 10 carbon atoms, the hydroxyl group of said monohydric alcohol being the sole group capable of reacting with epoxide groups, and the said components (a) and (b) being the sole components forming said etherification product, said polyglycidyl ether being a polyglycidyl ether of a polyhydroxy compound which contains at least two hydroxyl groups and is free from other substituents capable of reacting with epoxide groups.

2. An etherification product of (a) a polyglycidyl ether with (b) a higher monohydric alcohol containing a carbon chain of more than 10 carbon atoms, the hydroxyl group of said monohydric alcohol being the sole group capable of reacting with epoxide groups, and the said components (a) and (b) being the sole components forming said etherification product, said polyglycidyl ether being a mixture of polyglycidyl ethers obtainable by reacting 1 mol of 4:4'-dihydroxydiphenyl-dimethylmethane with at least 1.2 mols of epichlorhydrin in an alkaline medium.

3. An etherification product of (a) a polyglycidyl ether with (b) a higher monohydric alcohol containing a carbon chain of more than 10 carbon atoms, the hydroxyl group of said monohydric alcohol being the sole group capable of reacting with epoxide groups, and the said components (a) and (b) being the sole components forming said etherification product, said polyglycidyl ether being a mixture of polyglycidyl ethers obtainable by reacting 1 mol of 4:4'-dihydroxydiphenyldimethylmethane with at least 1.6 mols of epichlorhydrin in an alkaline medium.

4. An etherification product of (a) a polyglycidyl ether with (b) an unsaturated higher monohydric alcohol containing a carbon chain of more than 10 carbon atoms, the hydroxyl group of said monohydric alcohol being the sole group capable of reacting with epoxide groups, and the said components (a) and (b) being the sole components forming said etherification product, said polyglycidyl ether being a polyglycidyl ether of a polyhydroxy compound which contains at least two hydroxyl groups and is free from other substituents capable of reacting with epoxide groups.

5. An etherification product of (a) a polyglycidyl ether with (b) an unsaturated higher monohydric alcohol containing a carbon chain of more than 10 carbon atoms, the hydroxyl group of said monohydric alcohol being the sole group capable of reacting with epoxide groups, and the said components (a) and (b) being the sole components forming said etherification product, said polyglycidyl ether being a mixture of polyglycidyl ethers obtainable by reacting 1 mol of 4:4'-dihydroxydiphenyl-dimethylmethane with at least 1.2 mols of epichlorhydrin in an alkaline medium.

6. An etherification product of (a) a polyglycidyl ether with (b) an unsaturated higher monohydric alcohol containing a carbon chain of more than 10 carbon atoms, the hydroxyl group of said monohydric alcohol being the sole group capable of reacting with epoxide groups, and the said components (a) and (b) being the sole components forming said etherification product, said polyglycidyl ether being a mixture of polyglycidyl ethers obtainable by reacting 1 mol of 4:4'-dihydroxydiphenyl-dimethylmethane with at least 1.6 mols of epichlorhydrin in an alkaline medium.

7. An etherification product of (a) a polyglycidyl ether with (b) a mixture of monohydric unsaturated alcohols obtainable by the reduction of a triglyceride oil, the hydroxyl groups of said monohydric unsaturated alcohols being the sole groups capable of reacting with epoxide groups, and the said components (a) and (b) being the sole components forming said etherification product, said polyglycidyl ether being a mixture of polyglycidyl ethers obtainable by reacting 1 mol of 4:4'-dihydroxydiphenyl-dimethylmethane with at least 1.2 mols of epichlorhydrin in an alkaline medium.

8. An etherification product of (a) a polyglycidyl ether with (b) a mixture of monohydric unsaturated alcohols obtainable by the reduction of a triglyceride oil, the hydroxyl groups of said monohydric unsaturated alcohols being the sole groups capable of reacting with epoxide groups, and the said components (a) and (b) being the sole components forming said etherification product, said polyglycidyl ether being a mixture of polyglycidyl ethers obtainable by reacting 1 mol of 4:4'-dihydroxydiphenyl-dimethylmethane with at least 1.6 mols of epichlorhydrin in an alkaline medium.

9. An etherification product of (a) a polyglycidyl ether with (b) an unsaturated higher monohydric alcohol containing a carbon chain of more than 10 carbon atoms, the hydroxyl group of said monohydric alcohol being the sole group capable of reacting with epoxide groups, and the said components (a) and (b) being the sole components forming said etherification product, said polyglycidyl ether being a mixture of polyglycidyl ethers obtainable by reacting 1 mol of 4:4'-dihydroxydiphenyl-dimethylmethane with at least 1.2 mols of epichlorhydrin in an alkaline medium, said etherification product being at least partially polymerized by heat.

10. An etherification product of (a) a polyglycidyl ether with (b) an unsaturated higher monohydric alcohol containing a carbon chain of more than 10 carbon atoms, the hydroxyl group of said monohydric alcohol being the sole group capable of reacting with epoxide groups, and the said components (a) and (b) being the sole components forming said etherification product, said polyglycidyl ether being a mixture of polyglycidyl ethers obtainable by reacting 1 mol of 4:4'-dihydroxydiphenyl-dimethylmethane with at least 1.6 mols of epichlorhydrin in an alkaline medium, said etherification product being at least partially polymerized by heat.

11. A process for the manufacture of an etherification product of a polyglycidyl ether wherein (a) a polyglycidyl ether of a polyhydroxy compound, which contains at least two hydroxyl groups and is free from other substituents capable of reacting with epoxide groups, is reacted with (b) a higher monohydric alcohol containing a carbon chain of more than 10 carbon atoms, the hydroxyl group of said monohydric alcohol being the sole group capable of reacting with epoxide groups, and the said components (a) and (b) being the sole components forming said etherification product.

12. A process for the manufacture of an etherification product of a poylglycidyl ether wherein (a) a mixture of polyglycidal ethers obtainable by reacting 1 mol of 4:4'-dihydroxydiphenyl-dimethylmethane with at least 1.2 mols of epichlorhydrin in an alkaline medium is reacted by heat with (b) a higher monohydric alcohol containing a carbon chain of more than 10 carbon atoms, the hydroxyl group of said monohydric alcohol being the sole group capable of reacting with epoxide groups, and the said components (a) and (b) being the sole components forming said etherification product.

13. A process for the manufacture of an etherification product of a polyglycidyl ether wherein (a) a mixture of polyglycidyl ethers obtainable by reacting 1 mol of 4:4'-dihydroxydiphenyl-dimethylmethane with at least 1.2 mols of epichlorhydrin in an alkaline medium is reacted by heat in the presence of a catalyst selected from the group consisting of boron trifluoride, sodium hydroxide and sulfuric acid with (b) a higher monohydric alcohol containing a carbon chain of more than 10 carbon atoms, the hydroxyl group of said monohydric alcohol being the sole group capable of reacting with epoxide groups, and the said components (a) and (b) being the sole components forming said etherification product.

14. A process for the manufacture of an etherification product of a polyglycidyl ether wherein (a) a mixture of polyglycidyl ethers obtainable by reacting 1 mol of 4:4'-dihydroxydiphenyl-dimethylmethane with at least 1.2 mols of epichlorhydrin in an alkaline medium is reacted by heat with (b) an unsaturated higher monohydric alcohol containing a carbon chain of more than 10 carbon atoms, the hydroxyl group of said monohydric alcohol being the sole group capable of reacting with epoxide groups, and the said components (a) and (b) being the sole components forming said etherification product.

15. A process for the manufacture of an etherification product of a polyglycidyl ether wherein (a) a mixture of polyglycidyl ethers obtainable by reacting 1 mol of 4:4'-dihydroxydiphenyl-dimethylmethane with at least 1.2 mols of epichlorhydrin in an alkaline medium is reacted by heat with (b) an unsaturated higher monohydric alcohol containing a carbon chain of more than 10 carbon atoms and wherein the etherification product is subsequently at least partially polymerized by heat, the hydroxyl group of said monohydric alcohol being the sole group capable of reacting with epoxide groups, and the said components (a) and (b) being the sole components forming said etherification product.

References Cited in the file of this patent

UNITED STATES PATENTS

| Number | Name | Date |
|---|---|---|
| 2,197,357 | Widmer | Apr. 16, 1940 |
| 2,411,029 | DeGroote | Nov. 12, 1946 |
| 2,458,796 | Ott | Jan. 11, 1949 |
| 2,484,370 | Ballard | Oct. 11, 1949 |
| 2,500,765 | Montague | Mar. 14, 1950 |
| 2,637,715 | Ott | May 5, 1953 |

FOREIGN PATENTS

| Number | Country | Date |
|---|---|---|
| 884,271 | France | Apr. 19, 1943 |